(12) United States Patent
Sakamaki

(10) Patent No.: US 6,201,587 B1
(45) Date of Patent: Mar. 13, 2001

(54) APPARATUS HAVING A REWRITABLE DISPLAY PORTION

(75) Inventor: Teruo Sakamaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 08/799,485

(22) Filed: Feb. 12, 1997

(30) Foreign Application Priority Data

| Feb. 13, 1996 | (JP) | ................................................... 8-025422 |
| Feb. 13, 1996 | (JP) | ................................................... 8-025542 |
| Feb. 13, 1996 | (JP) | ................................................... 8-048471 |

(51) Int. Cl.[7] ............................ G02F 1/137; G02F 1/133
(52) U.S. Cl. ................................ 349/86; 349/20; 349/1
(58) Field of Search .......................... 349/2, 3, 12, 86, 349/1, 20, 33, 193

(56) References Cited

U.S. PATENT DOCUMENTS 6,002,383 * 12/1999 Shimada ......................... 252/299.01

FOREIGN PATENT DOCUMENTS

| 752323 | 1/1997 | (EP) . |
| 2256496 | 12/1992 | (GB) . |
| 92/22901 | 12/1992 | (WO) . |

OTHER PUBLICATIONS

Patent Abstracts of Japan No. 7234635 dated May 9, 1995.
Patent Abstracts of Japan No. 7296574 dated Nov. 10, 1995.
Patent Abstracts of Japan No. 4071899 dated Mar. 3, 1992.
Patent Abstracts of Japan No. 5031489 dated Feb. 9, 1993.

* cited by examiner

*Primary Examiner*—William L. Sikes
*Assistant Examiner*—Tai V. Duong
(74) *Attorney, Agent, or Firm*—Smith, Gambrell & Russell, LLP

(57) ABSTRACT

A videocassette has a display portion for displaying recorded contents. The display portion is formed with a display device. The display device has a conductive layer, a PDLC (polymer-dispersed liquid crystal) film, and a protective layer. The display device can repeatedly record and erase visible information.

4 Claims, 12 Drawing Sheets

APPARATUS HAVING A REWRITABLE DISPLAY PORTION

BACKGROUND OF THE INVENTION

1. Field of the Invention

The present invention relates to an apparatus having a display portion that allows what is displayed thereon to be rewritten easily.

2. Description of the Prior Art

As is well known, a recording medium such as a floppy disk, an optical disk, a magneto-optical disk, and a videocassette has a display portion for displaying recorded contents, and such a display portion is usually realized as an adhesive label stuck on the outer casing of the recording medium.

With a conventional recording medium as mentioned above, rewriting of the recorded contents requires replacement of the label, and is thus considerably time-consuming. For this reason, the user often leaves the label blank when using a medium whose contents are frequently rewritten, and eventually forgets what are contained in the medium.

Moreover, in handling a medium whose contents are continually updated as it is used, it is not practical to replace the label every time when the recorded contents are updated. Accordingly, the user usually notes down on the label only an outline of the recorded contents, and thus there is no way of knowing precisely what are contained in the medium at a particular time point.

Moreover, since the display portion (label) is usually filled in with text indicating the recorded contents, it becomes more and more difficult to recall the recorded contents from the text as time passes and the impression of the recorded contents becomes fainter. This is inconvenient especially in handling a large number of recording media.

SUMMARY OF THE INVENTION

An object of the present invention is to make easier the rewriting of what is displayed on the display portion.

To achieve the above object, according to the present invention, in an apparatus having a display portion for displaying recorded contents, said display portion is formed with a display device to and from which visible information can be written and erased repeatedly.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings.

Figure 1:
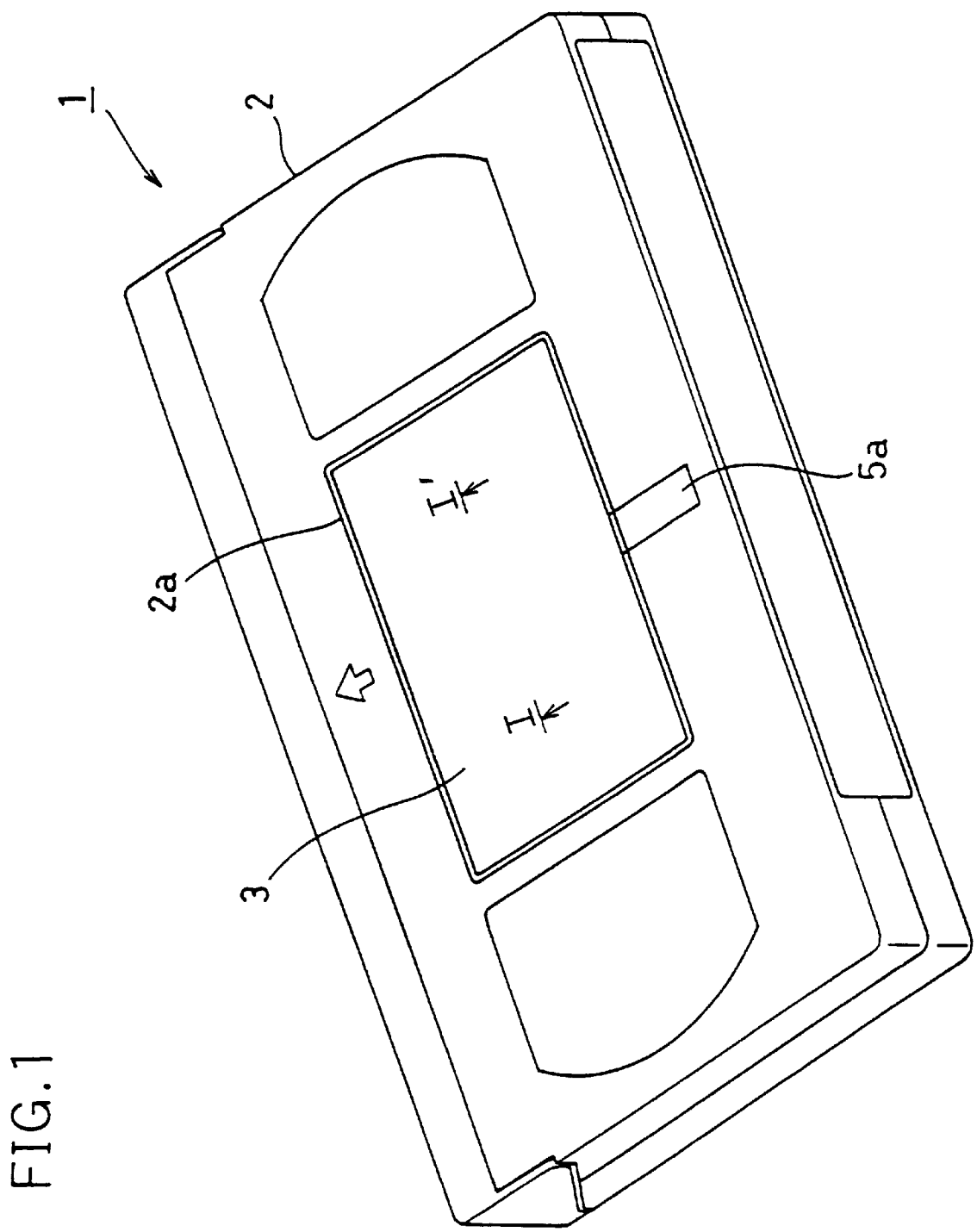
FIG. 1 is a perspective view of a videocassette embodying the present invention.
Figure 2:
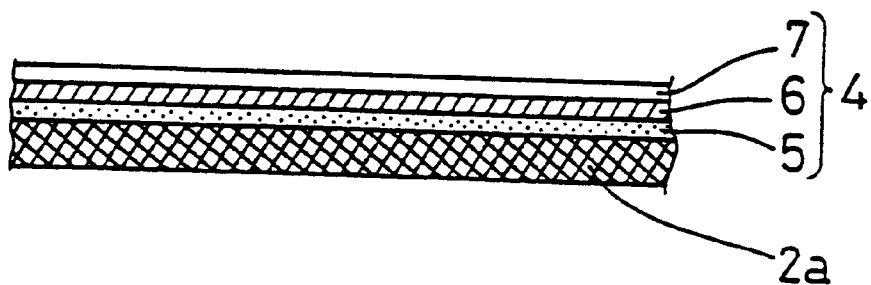
FIG. 2 is a cross-sectional view of the reversible display device, showing an example of its construction, taken along line I—I' of FIG. 1.

FIG. 1 is a perspective view of a videocassette embodying the present invention. FIG. 2 is a cross-sectional view taken along line I—I' of FIG. 1.

As shown in FIG. 1, the videocassette (recording medium) 1 has an outer casing 2 made of synthetic resin and formed approximately in the shape of a rectangular parallelepiped, and a magnetic tape (not shown) contained in this outer casing 2. At the center of the top surface of the outer casing 2 is formed a rectangular recess 2a, in which a display portion 3 having a reversible display device is placed.

The reversible display device constituting the display portion 3 has a polymer-dispersed liquid crystal film (hereinafter referred to as the PDLC film) that is obtained by dispersing liquid crystal molecules in a high-polymer material, and a means for applying to the PDLC film an electric field in a direction perpendicular thereto. This means is realized as electrodes that support the PDLC film from its both sides; alternatively, it is also possible to provide the PDLC film only with a back-side electrode and use an externally provided electrode as a front-side electrode. The latter method is preferable because it allows an electric field to be applied only to selected portions of the PDLC film. In short, the reversible display device has at least an electrode (conductive layer) and a PDLC film, and additionally, where necessary, a protective layer for protecting the PDLC film. If the surface of the recording medium on which the reversible display device is placed is made of a conducting material, the conductive layer may be omitted.

With the reversible display device having a PDLC film, writing and erasing of visible information is performed in the following way. Application of heat or an electric field (utilization of a heat/electric-field mode) to the PDLC film changes how orderly its liquid crystal molecules are oriented (between a state called homeotropic or homogeneous orientation and a state of random orientation). This causes the PDLC film to change its state between a state in which it scatters light and a state in which it transmits light (or, in the case where two-color pigment is mixed to achieve the guest-host effect, between two states of the pigment with different degrees of light absorption). Thus, the opaque state (in which light is scattered) and the transparent state (in which light is transmitted) of the PDLC film can be used, for example, as the recorded state and the erased state, respectively. In this case, recording is achieved by using a heating means capable of spot-heating, such as a thermal head or laser head, whereas erasing is achieved by applying to the PDLC film an electric field that is strong enough to cause re-orientation of the liquid crystal molecules.

Compared with various types of conventional reversible display devices that utilize a heat/heat mode, the PDLC film is far more suitable for use with recording media because of the following advantages it offers. The PDLC film requires only several microseconds to re-orient its molecules in response to application of an electric field, and thus allows very quick rewriting; it also allows rewriting to be repeated a sufficient number of times. Moreover, the PDLC film offers excellent visibility, especially when two-color pigment is mixed. Furthermore, since the PDLC film requires two types of energy from outside to achieve rewriting, what is displayed thereon is difficult to falsify and resistant to normal ambient conditions, and thus the PDLC film offers high reliability of display.

As the PDLC film, it is possible to employ, for example, one of those proposed in Japanese Laid-open Patent Application No. H4-71899. In particular, a PDLC film that is produced by the microcapsule method is especially suitable for the present purpose because of many advantages it offers; for example, in a PDLC film of this type, the liquid crystal is completely contained in microcapsules so as not to ooze out. Alternatively, it is also possible to employ one of the PDLC films proposed in Japanese Laid-open Patent Application No. H5-301489, and Japanese Patent Applications Nos. H6-33283, H6-44735, and H6-119702.

FIG. 2 shows the construction of the layers constituting the reversible display device 4 employed in the embodiment under discussion. As shown in FIG. 2, on the recess 2a formed on the outer casing 2, a conductive layer 5, a PDLC film 6, and a protective layer 7 are laid in this order. The reversible display device 4 is formed on the recess 2a through a well-known process such as painting, printing, transferring, or laminating.

As the high-polymer matrix for holding the liquid crystal dispersed in the PDLC film 6, it is possible to use, for example, vinyl chloride resin; vinyl chloride based resin such as copolymer of vinyl chloride and vinyl acetate; vinylidene chloride based resin; acrylic resin such as polyacrylate, polymetacrylate, or copolymer of acrylate and metacrylate; polyvinyl alcohol based resin; polycarbonate resin; polyester based resin; epoxy based resin; polyamide based resin; polyurethane based resin; polythiol based resin; or resin that sets when irradiated with an ionizing radiation such as an ultraviolet radiation or electron beam.

As the liquid crystal, it is possible to use, for example, smectic liquid crystal, nematic liquid crystal, cholesteric liquid crystal, dichcholesteric liquid crystal, high-polymer liquid crystal, or a combination of some of these types of liquid crystal. Moreover, by mixing an adequate amount of two-color pigment to the liquid crystal, it is possible to enhance contrast and visibility as a result of the guest-host effect.

As the method for dispersing the liquid crystal in the high-polymer matrix, it is possible to use, for example, the phase separation method, emulsion method, microcapsule method, solvent evaporation method, or suspension polymerization method. Among these methods, the emulsion method and microcapsule method are suitable for the present purpose, since they have the advantage of preventing the liquid crystal from oozing out. The microcapsule method has an additional advantage of enhancing durability of the dispersed liquid crystal particles, and in particular the microcapsule method based on in-situ polymerization is excellent in that it offers particle diameters smaller than 10 pm that are most suitable to obtain practical film thicknesses as well as satisfactory display quality.

Normally, the thickness of the PDLC film 6 is roughly three to twenty-three pm; the lower limit of the thickness is determined in consideration of the degree of contrast desired in the display, and the upper limit is determined in consideration of the practical voltage to be applied to achieve re-orientation of the liquid crystal molecules.

As the conductive layer 5, it is possible to use a semiconductor material having a conductivity high enough (e.g. having an area resistance of $10^{12}$ Ω/sq or less) to allow the conductive layer 5 to serve as a horizontal electric path across the PDLC film 6 and thus to allow a vertical electric field to be applied to the PDLC film 6. However, considering that part of the applied voltage is inevitably lost for some reason or other, it is preferable to use a conducting material. For example, the conductive layer 5 is formed from foil or an evaporation-deposited film of metal such as aluminum, or a transparent film of a conducting material such as ITO (indium tin oxide), or a painted film of a conducting material such as carbon black.

In this embodiment, as shown in FIG. 1, at the rear edge of the conductive layer 5 is formed a terminal 5a that extends backward beyond the edge of the recess 2a. When the videocassette 1 is loaded into an indexing apparatus 10, which will be described later, this terminal 5a makes contact with a grounded terminal provided inside the indexing apparatus 10. The conductive layer 5 is formed from a transparent material. Accordingly, the terminal 5a which is a part of the conductive layer 5 is not conspicuous. The terminal 5a may be extended further to reach the back surface of the outer casing 2; in this case, the terminal 5a makes contact with the chassis of the indexing apparatus 10 to achieve grounding. Moreover, even if the terminal 5a is not provided, re-orientation of the liquid crystal molecules can be achieved by arranging a charger close to but not in contact with a side surface of the PDLC 6, or by bringing an electrode into contact with the PDLC film 6.

The protective layer 7 is provided, where necessary, to protect the PDLC film 6 against pressure and other forces that may be applied from outside and against the ambient conditions, and further to make the PDLC film 6 heat-resistant, wear-resistant, and mar-resistant against the print head 18, which will be described later, of the index device 10. As the protective layer 7, it is preferable to use setting resin such as thermosetting resin or resin that sets when irradiated with an ionizing radiation such as an ultraviolet radiation or electron beam, because such resin has properties suitable for the present purpose. Paint or ink made from such resin is mixed with adequate amounts of various additives including a lubricant such as wax, and is then applied over the entire surface or on limited portions of the PDLC film 6. The thickness of the protective layer 7 is roughly 0.5 to 10 pm.

The protective layer 7 is formed where the PDLC film 6, including all of its top and side surfaces, is not formed, that is, on the portion excluding the display portion 3. Specifically, the protective layer 7 is formed, for example, on the conductive layer 5, on the portion where permanently fixed information is written, or over the entire surface of a base sheet, which will described later. When the protective layer 7 is formed over the entire surface of the base sheet, the protective layer 7 is formed as a resin film made of polyethylene terephthalate or the like.

Figure 3:
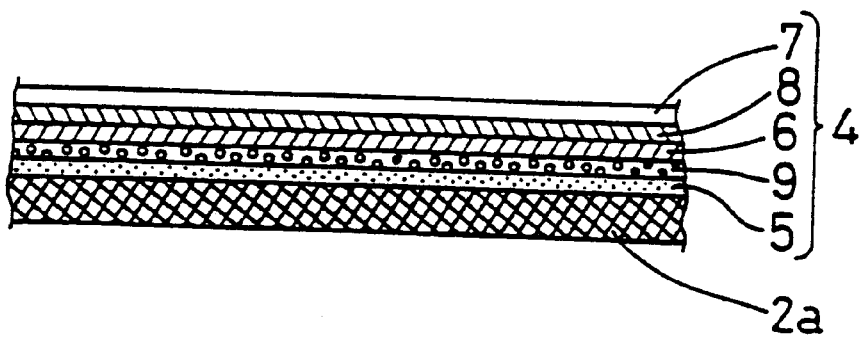
FIG. 3 is a cross-sectional view of the reversible display device, showing another example of its construction, taken along line I–I' of FIG. 1.

As shown in FIG. 3, it is also possible to place an intermediate layer 8 between the PDLC film 6 and the protective layer 7, and an adhesive layer 9 between the PDLC film 6 and the conductive layer 5. The intermediate layer 8 serves to protect the PDLC film 6 from damage that may be caused when the protective layer is formed by painting or in some other way. The adhesive layer 9 serves to improve the adhesion between the conductive layer 5 and the PDLC film 6.

When the protective layer 7 is formed by painting, the solvent contained in the paint may seep into the PDLC film 6, thereby degrading its liquid crystal orientation characteristics. This can be prevented by first forming the intermediate layer 8, as a barrier layer, from paint that does not affect the liquid crystal, and then forming the protective layer 7. In this case, the intermediate layer 8 is formed from water-soluble paint containing water-soluble resin such as polyvinyl alcohol, polyvinyl pyrrolidone, carboxymethyl cellulose, or starch. The thickness of the intermediate layer 8 is roughly 0.5 to 10 pm. The protective layer 7 and the intermediate layer 8 need to be thin enough to ensure that a desired electric field is obtained without application of an unduly high voltage.

The provision of the intermediate layer 8 allows a wider choice of resin for the protective layer 7. For example, by forming the protective layer 7 from soft urethane acrylate or similar resin that sets when irradiated with an ionizing radiation such as an ultraviolet radiation or electron beam, it is possible to obtain excellent heat-resistance, wear-resistance, mar-resistance, as well as appropriate touch and shock absorption against the print head.

Moreover, it is also possible to place the reversible display device 4 on a base sheet having on its back side an adhesive layer so that the base sheet can be stuck onto the recording medium.

As the base sheet, it is possible to use, for example, a sheet or board of polyester based resin such as polyethylene terephthalate, vinyl chloride based resin such as polyvinyl chloride, olefin based resin such as polypropylene, acrylic resin such as polymethyl methacrylate, styrene based resin such as polystyrene, or cellulose based resin such as cellulose triacetate, or alternatively a sheet of paper such as coating paper, synthetic paper, metal foil, a ceramic sheet, or a composite sheet produced by combining some of these materials. The thickness of the base sheet, though it should be determined in accordance with uses, is roughly 50 to 1,000 pm. The base sheet is normally formed as a non-conductive layer. However, if the base sheet is formed as a layer having a moderate conductivity (i.e. having a volume resistance of roughly $10^8$ Ω or less, with the actual thickness), it is possible to use the base sheet also as the conductive layer 5, and thus to omit the conductive layer 5.

The surface of the recording medium and that of the base sheet may be treated by any of the well-known adhesion-easing methods, such as the corona treatment, or the primer treatment using a silane coupling agent or urethane resin, in order to improve adhesion between those surfaces and the conductive layer 5.

In a case where the conductive layer 5 is formed as a transparent layer, the color below, that is, the color of the surface of the recording medium 1 such as a videocassette or the color of the base sheet is seen through the conductive layer 5. To avoid this, and thereby to improve the visibility of the image displayed on the surface of the reversible display device 4, the conductive layer 5 is formed from that material with which the outer casing of the recording medium 1 is colored, or the base sheet is formed as a sheet of paper or resin having white or other color, or a concealing layer (not shown) having white or other color is additionally formed under the conductive layer 5 by painting or coating. In particular, by using two-color pigment of the type that produces black color, it is possible to display characters in black against a white background, and thus to obtain excellent visibility.

Next, a description will be given as to the indexing apparatus for writing and erasing information to and from the display portion 3 of the videocassette 1.

Figure 4:
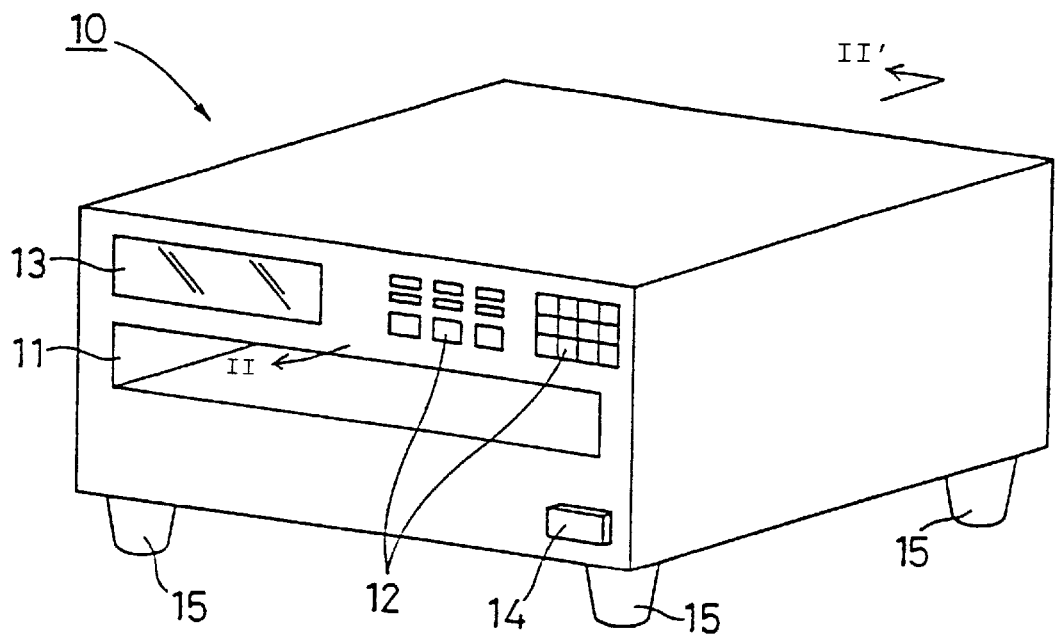
FIG. 4 is a perspective view of the indexing apparatus.

As shown in FIG. 4, the indexing apparatus 10 has the shape of a rectangular parallelepiped, and is provided with a cassette inserting slot 11 extending from the front side to the rear side of the indexing apparatus 10 and having a rectangular cross section. The videocassette 1 is inserted, with its recess 2a facing upward, into the cassette inserting slot 11 from the front side of the indexing apparatus 10, and is pushed until its forward end strikes the innermost end of the cassette inserting slot 11 and thus the videocassette 1 is secured in position. On the front surface of the indexing apparatus 10 are arranged a set of operation knobs 12, a display 13 having a liquid crystal display device or the like, and a power switch 14. On the bottom surface of the indexing apparatus 10, feet 15 are provided in the four corners.

Figure 5:
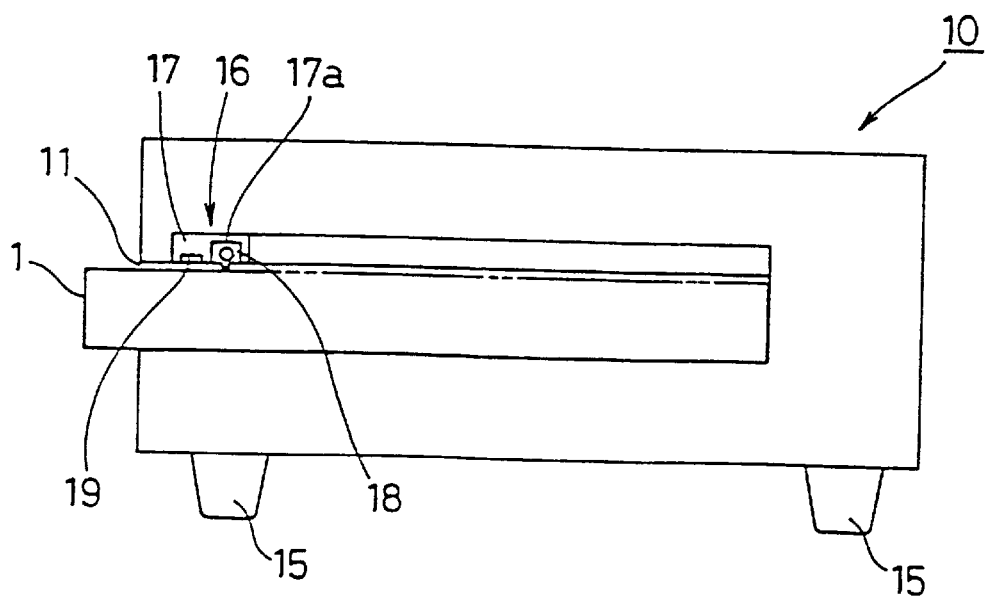
FIG. 5 is a cross-sectional view of the indexing apparatus, taken along line II—II' of FIG. 4.

As shown in FIG. 5, above the cassette inserting slot 11 inside the indexing apparatus 10 is provided a write/erase mechanism 16. The write/erase mechanism 16 writes and erases information concerning recorded contents to and from the display portion 3 while it runs, on a plane parallel to the top surface of the videocassette 1, in a scanning direction (from the right-hand side to the left-hand side of the indexing apparatus 10 and vice versa) and in a traversing direction (from the front side to the rear side of the indexing apparatus 10 and vice versa).

The write/erase head 16 is provided with a movable member 17 having the shape of a rectangular parallelepiped extending from the left-hand side to the right-hand side of the indexing apparatus 10 and made of synthetic resin or the like. On the bottom surface of the movable member 17 are provided a print head 18 and an erase head 19.

Figure 6:
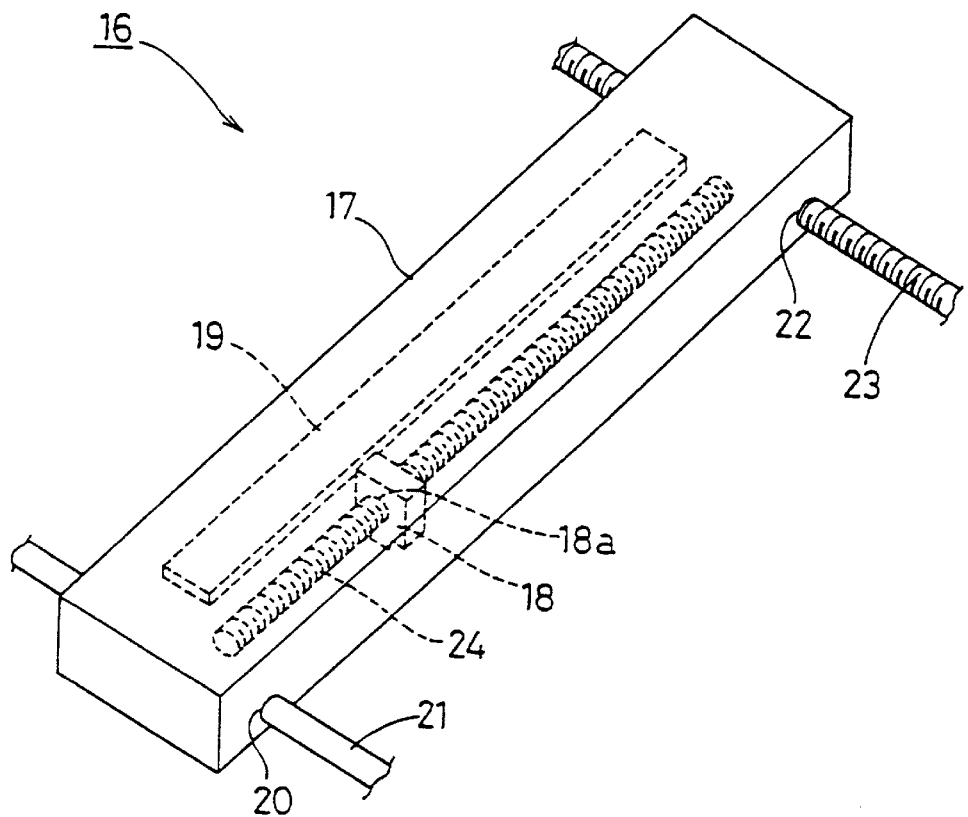
FIG. 6 is a perspective view of the write/erase mechanism of the indexing apparatus.

As shown in FIG. 6, at one end of the movable member 17 is formed a through hole 20, through which a support shaft 21 extending from the front side to the rear side of the indexing apparatus 10 is slidably disposed. The support shaft 21 is supported at its both ends by brackets provided on the chassis (not shown) of the indexing apparatus 10. At the other end of the movable member 17 is formed a threaded hole 22, through which a rotary shaft 23 extending from the front side to the rear side of the indexing apparatus 10 and having threads formed on its outer surface is disposed so as to be thread-engaged with the threaded hole 22. The rotary shaft 23 is rotatably supported at its both ends by brackets provided on the chassis of the indexing apparatus 10. Moreover, one end of the rotary shaft 23 is coupled to a motor (not shown) mounted on the above-mentioned chassis. When the motor is driven, the movable member 17, guided by the support shaft 21, moves forward or backward inside the indexing apparatus.

On the bottom surface of the movable member 17 is formed a guide groove 17a extending in the direction of the length of the movable member 17 and having a rectangular cross section (see also FIG. 5). With this guide groove 17a, the print head 18 is slidably engaged. The print head 18 writes information to the display portion 3 by applying heat thereto, and, to achieve this, it is provided with a laser beam head or thermal head. The print head 18 has a threaded hole 18a, through which a rotary shaft 24 extending in the direction of the length of the movable member 17 and having threads formed on its surface is disposed so as to be thread-engaged with the threaded hole 18a. The rotary shaft 24 is rotatably supported at its both ends by brackets (not shown) provided on the movable member 17. Moreover, one end of the rotary shaft 24 is coupled to a motor (not shown) mounted on the movable member 17. When the motor is driven, the print head 18, guided by the guide groove 17a, moves in the direction of the length of the movable member 17.

Figure 7:
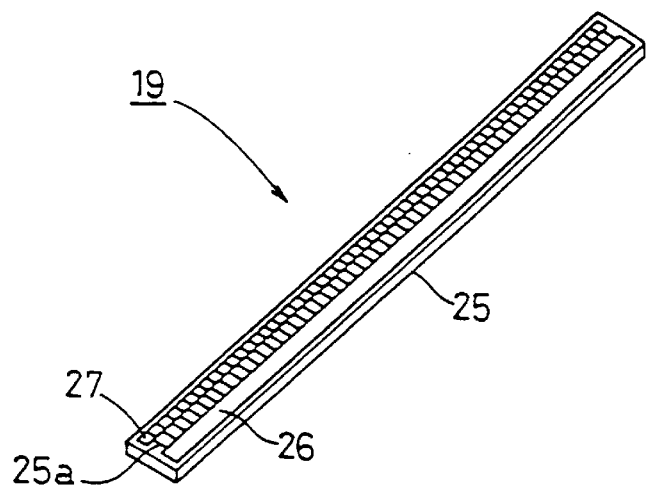
FIG. 7 is a perspective view of the erase head as seen from below.

The erase head 19 erases information from the display portion 3 by applying an electric field thereto. FIG. 7 is a perspective view of the erase head 19 as seen from below. As shown in FIG. 7, the erase head 19 is provided with a rectangular circuit board 25 extending in the direction of the length of the movable member 17, a voltage supplier 26 disposed on the circuit board 25 to extend in the direction of the length thereof, and a number of electrodes 27 arranged on the circuit board 25 to form an array in the direction of the length thereof and connected to the voltage supplier 26 via a conductive pattern 25a formed on the circuit board 25.

In a position above the cassette inserting slot 11, close to the front surface of the indexing apparatus 10, a grounded terminal (not shown) is provided that makes contact with the terminal 5a provided on the top surface of the outer casing 2 of the videocassette 1.

Figure 8:
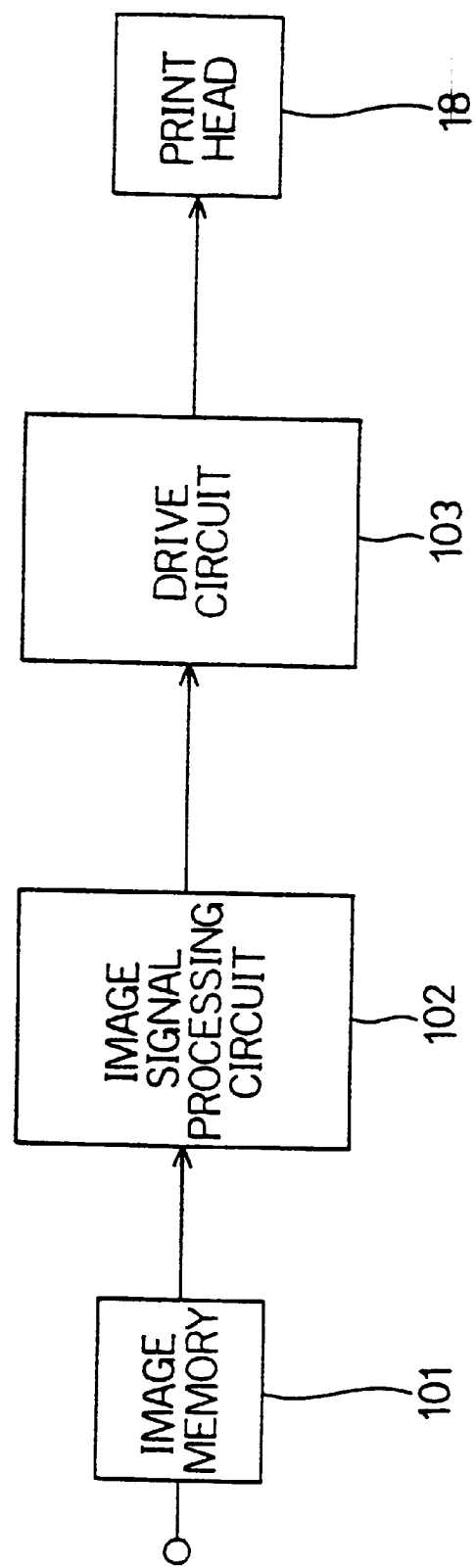
FIG. 8 is a block diagram showing the construction of the image processing circuit of the indexing apparatus.
Figure 9:
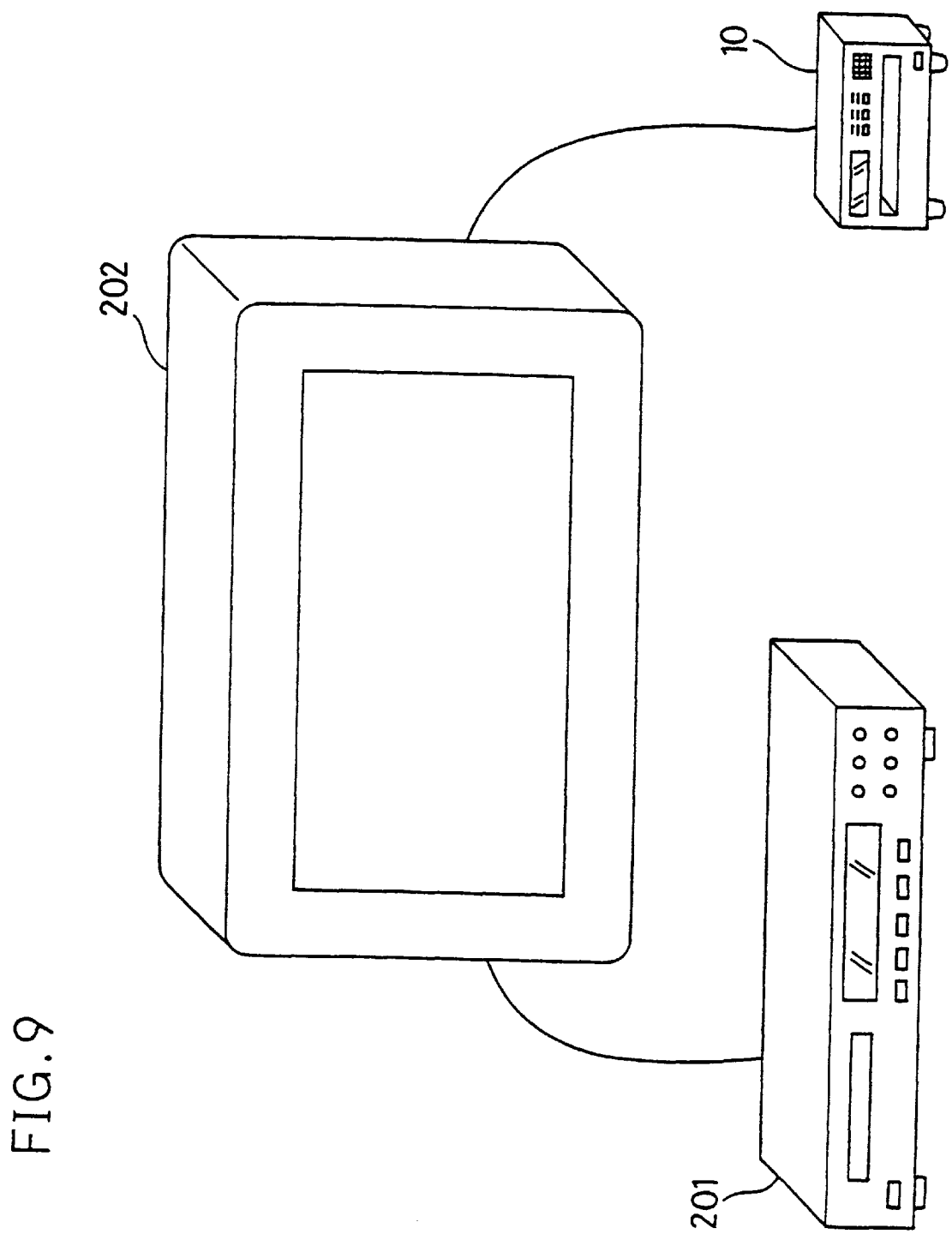
FIG. 9 is a diagram showing the construction of a system for writing an image recorded on the videocassette to the display portion.

FIG. 8 is a block diagram showing the construction of the image processing circuit provided in the indexing apparatus 10. FIG. 9 is a diagram showing the construction of the system for writing a portion of a video recorded on the videocassette 1 to the display portion 3 of the videocassette 1.

Next, a description will be given as to the method of writing part of the video recorded on the videocassette 1 to the display portion 3, with reference to FIGS. 8 and 9. First, as shown in FIG. 9, a videocassette 1 is loaded into a videocassette recorder 201 for reproduction. The reproduced images are displayed on a television monitor 202. During reproduction, the television monitor 202 feeds the indexing apparatus 10 with a video signal. As shown in FIG. 8, the indexing apparatus 10 is provided with an image memory 101 having a capacity to store one frame (two fields) of image data, so that, during reproduction, image data is continuously written to the image memory 101 one frame after another in order to keep the latest frame in the image memory 101.

When a predetermined knob among the set of operation knobs 12 is operated to bring the indexing apparatus 10 into the write mode, updating of the image memory 101 is halted. Then, the reproduction operation of the videocassette recorder 201 is stopped, and the videocassette 1 is taken out of the videocassette recorder 201 and is loaded into the indexing apparatus 10. In this state, when another knob among the set of operation knobs 12 is operated to start the write operation, the image data of one frame stored in the image memory 101 is read out, processed by an image signal processing circuit 102, and fed to a drive circuit 103.

The drive circuit 103 produces, for individual picture elements, pulses having pulse widths varying with the level of the image signal, and, using the thus produced pulses, it drives the print head 18. If the print head 18 is formed with a laser-head, a laser beam is emitted during the time periods corresponding to the pulse widths of those pulses. The print head 18 is driven by the above described driving mechanism to scan the display portion 3 in the direction from the left-hand side to the right-hand side of the indexing apparatus 10 and vice versa (i.e. in the scanning or horizontal direction) and also in the direction from the front side to the rear side of the indexing apparatus 10 and vice versa (i.e. in the traversing or horizontal direction), and meanwhile the print head 18 forms an image of the above-mentioned one frame by applying heat produced by a thermal head or laser beam to the display portion 3. Note that signals required to perform scanning are produced within the indexing apparatus 10 in the same manner as in printers and the like.

Moreover, in cases where a thermal head is used to form images, not only a thermal head of the type as described above, generally called a serial head, which writes information as it moves from left to right as well as back and forth, but also a thermal head of the type called a line head, which has a plurality of thermal heads arranged in an array from left to right, can be used. A thermal head of the line-head type needs to be moved only back and forth to perform scanning, and accordingly it can form images faster than a thermal head of the serial-head type.

Next, a description will be given as to the method of erasing an image displayed on the display portion 3. When a predetermined knob among the set of operation knobs 12 is operated, the voltage supplier 26 applies a voltage to those electrodes 27 which are located in an area specified through operation of the knob. On the other hand, a ground voltage is applied through the terminal 5a to the conductive layer 5 of the display portion 3. As a result, an electric field is produced between the electrodes 27 to which the voltage is applied and the conductive layer 5, and thus the information (an image) written in that area of the PDLC film where the electric field is produced is erased.

Figure 10:
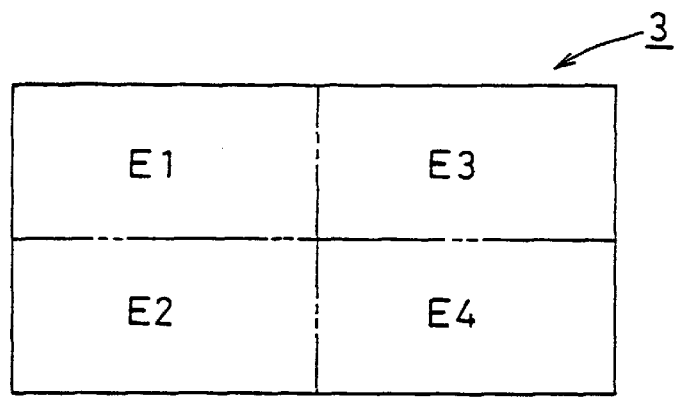
FIG. 10 is a diagram showing a modified embodiment in which the display portion is divided into a plurality of areas so that different images can be displayed on separate areas.

As shown in FIG. 10, it is also possible to divide the display portion 3 into four areas El to E4 so that an image can be written to and displayed in each area individually. This permits more than one scene to be displayed simultaneously on the display portion 3. In this case, writing of an image to a specific area can be achieved by restricting the scanning range of the print head 18; erasing of an image in a specific area can be achieved by restricting the movement range of the erase head 19 and selecting a limited number of electrodes 27 to apply the voltage. Note that the display portion 3 does not necessarily have to be divided into four areas, but can be divided into any number of areas.

Although, in the embodiment shown in FIG. 9, writing and erasing of images to and from the display portion 3 is performed on the indexing apparatus 10 that is provided as a separate unit from the videocassette recorder 201, it is also possible to incorporate the functions and construction of the indexing apparatus 10 into the videocassette recorder 201 so that writing and erasing of images to and from the display portion 3 can be performed with the videocassette 1 loaded in the videocassette recorder 201.

Figure 11:
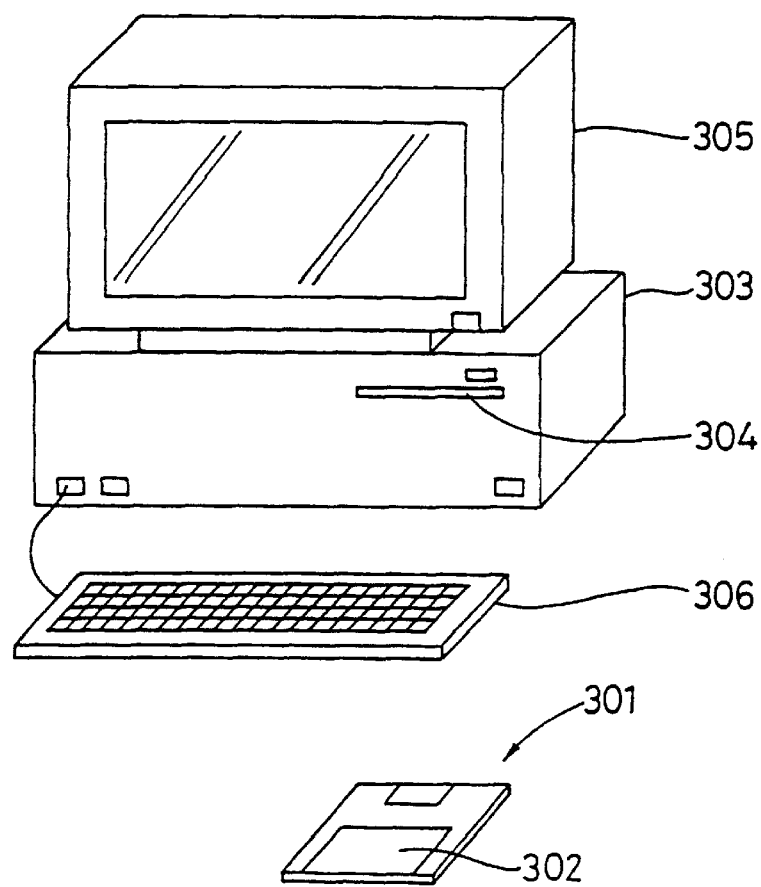
FIG. 11 is a diagram showing another embodiment of the present invention.

FIG. 11 shows another embodiment in which a floppy disk 301 has a display portion 302 formed with the same reversible display device 4 as described above, and a personal computer 303 is configured to have the same functions as the indexing apparatus 10 described above.

In this embodiment, a write/erase mechanism 16, which is constructed as shown in FIG. 6, for example, is provided inside a floppy-disk inserting slot 304. When a floppy disk 301 is inserted in the floppy-disk inserting slot 304 and the personal computer 303 is operated through a keyboard 306 in a predetermined way, what is displayed on the screen of a monitor 305 is written to the display portion 302 of the floppy disk 301. For example, it is possible to write thereto file names, an index of recorded contents, images, or other. Erasing of information can also be performed by operating the personal computer 303 through the keyboard 306, with the floppy disk 301 inserted in the floppy-disk inserting slot 304.

In cases where, as opposed to the embodiment shown in FIG. 11, the personal computer 301 does not have write/erase functions, writing and erasing of information to and from the display portion 302 of the floppy disk 301 can be performed by using a separately provided indexing apparatus 10 as shown in FIG. 4. In this case, the indexing apparatus 10 receives file names, image data, or other from the personal computer 303 via a cable. Moreover, in this case, it is possible to omit the image memory 101 of the indexing apparatus 10 and use instead a memory provided in the personal computer 303.

Furthermore, it is also possible to design the indexing apparatus 10 to serve as a floppy disk drive that can be connected to the personal computer so that the indexing apparatus 10 can be used also as an external storage device for the personal computer. In this case, too, images are stored either in the memory provided in the indexing apparatus 10 or in the memory provided in the personal computer.

Note that, although a floppy disk and a videocassette are taken as examples of recording media in the above described embodiments, the present invention can be applied to any recording medium, such as a magneto-optical disk, optical disk, IC memory card, or audio cassette. Here, an optical disk may be a CD (compact disc), CD-ROM (compact disc read-only memory), mini disc (having a size of approximately 2.5 inches by 2.5 inches, mainly used for recording and reproducing music and also known as MD), or DVD (digital versatile disc) such as a DVD-ROM or DVD-RAM.

Moreover, although information is written to and erased from the surface of the outer casing of a recording medium in the above embodiments, it is also possible to form a display portion directly on a recording medium itself. For example, for a medium that is usually not stored in an outer casing, the display portion can be formed, in the case of a CD-ROM or DVD-ROM, on a central portion of its surface or, in the case of an IC memory card, on a flat portion of its surface excluding portions occupied by ICs, so that information, including images, related to the contents recorded on the medium can be written to and erased from such a display portion.

Moreover, although images are written to the display portion of a recording medium in the above embodiments, it is also possible to write thereto information other than images. For example, for audio cassettes, on which no video signals can be recorded, it is possible to write text, symbols, numbers, and others, provided that a dedicated indexing apparatus for writing such information is prepared.

Furthermore, in the above embodiments, it is also possible to employ, though with slightly lower display resolution, a reversible heat-sensitive recording layer, which is a material that can produce visible changes in its state in a reversible manner in response to temperature variations. In a reversible heat-sensitive recording layer, changes in the state are recognizable as changes in color and/or shape. For the present purpose, a reversible heat-sensitive recording layer of the type that mainly produces changes in color is suitable. In such a reversible heat-sensitive recording layer, changes in color result from changes in such properties as transmissivity, reflectivity, absorption spectrum, or degree of scattering. In practice, a reversible heat-sensitive recording layer usually achieves changes in color by combined changes in those properties. Specifically, for the present purpose, any reversible heat-sensitive recording layer can be used that changes its transparency or hue in a reversible manner in accordance with the heat applied. For example, it is possible to use a reversible heat-sensitive recording layer that changes its color to a first color when heated to a first particular temperature above normal temperature, and changes its color to a second color when first heated to a second particular temperature above the first particular temperature and then cooled down; in particular, one that shows different colors at the first and second particular temperatures is especially suitable for the present purpose. As such reversible heat-sensitive recording layers, to name a few, Japanese Laid-open Patent Application No. 55-154198 proposes one that becomes transparent at the first particular temperature and becomes opaque at the second particular temperature; Japanese Laid-open Patent Applications Nos. H4-224996, H4-247985, and H4-267190 propose ones that take on color at the second particular temperature and lose it at the first particular temperature; Japanese Laid-open Patent Application No. H3-169590 proposes one that becomes opaque at the first particular temperature and becomes transparent at the second particular temperature; and Japanese Laid-open Patent Applications Nos. H2-188293 and H2-188294 propose ones that take on color, such as black, red, or blue, at the first particular temperature and lose it at the second particular temperature. Among these, the following two types of materials are especially suitable for the present purpose:

(1) a material that can change its state between a transparent state and an opaque state in a reversible manner;
(2) a material that can chemically change the color of its pigment or the like.

The material noted at (1) above typically includes a heat-sensitive layer that is obtained by dispersing a low-molecule-weight organic substance such as a higher alcohol or higher fatty acid in a base material made of resin such as polyester. The material noted at (2) above typically includes a leuco-based heat-sensitive recording material with enhanced reversibility.

In the recording media of the embodiments described above, the display portion is formed with a display device to and from which visible information can be written and erased repeatedly. This eliminates the need to replace labels when the information displayed on the display portion needs alteration, and accordingly it is possible to rewrite with ease the information displayed on the display portion.

Moreover, an image obtained by processing the image signal recorded on the recording medium can be displayed in the display portion. This makes it easy to recognize the contents recorded in the recording medium, and is convenient especially in handling a large number of recording media.

Figure 12:
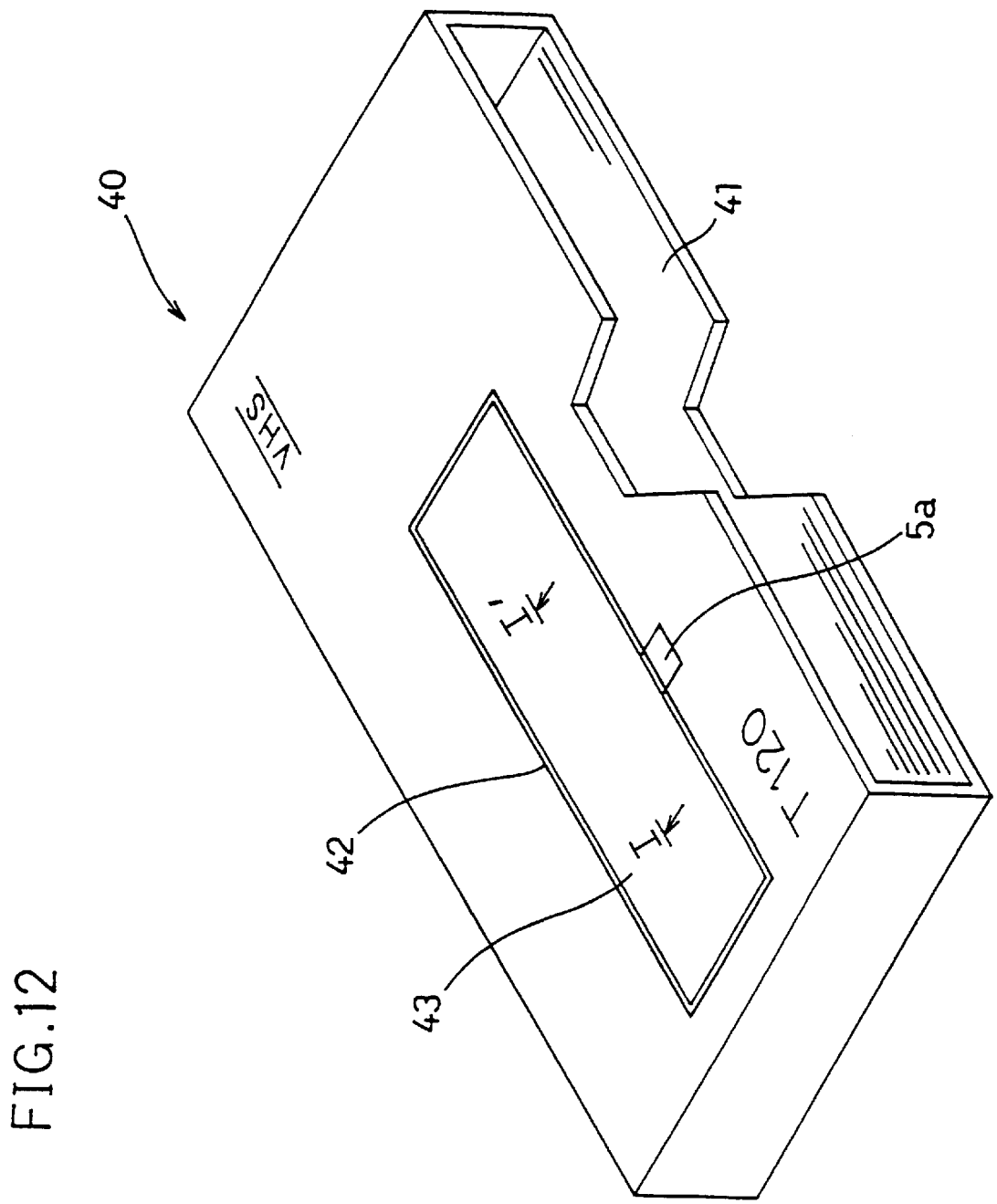
FIG. 12 is a perspective view of a videocassette case embodying the present invention.

The display portion 3 may be provided, not on the videocassette 1 itself as in the embodiment shown in FIG. 1, but on the container (case) in which the videocassette is stored. FIG. 12 shows an embodiment in which a display portion is provided on such a container of a recording medium. As shown in FIG. 12, the container 40 is box-shaped and made of synthetic resin or the like, and has on one side an opening 41 through which a videocassette is put into and taken out of the container 40. On the top surface of the container 40 is formed a rectangular recess 42, in which a display portion 43 formed with a reversible display device as described above is placed. Accordingly, the construction of this display portion 43 and the methods for writing and erasing information thereto and therefrom are just the same as those described heretofore with respect to the display portion 3 with reference to FIGS. 1 to 10.

Next, as another embodiment of the present invention, a mechanically scrollable display having a display portion as described above will be described with reference to FIGS. 13 to 16.

Figure 13A:
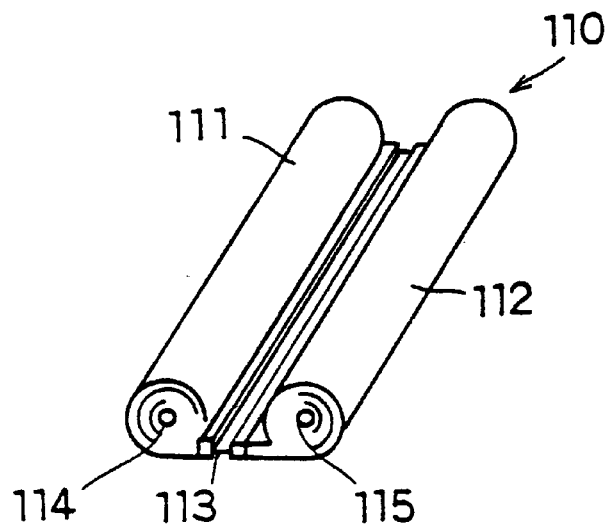
FIGS. 13A and 13B are diagrams schematically showing the mechanically scrollable display embodying the present invention, FIG. 13A illustrating the display when it is closed (rolled up), and FIG. 13B illustrating the display when it is open (unrolled)
Figure 13B:
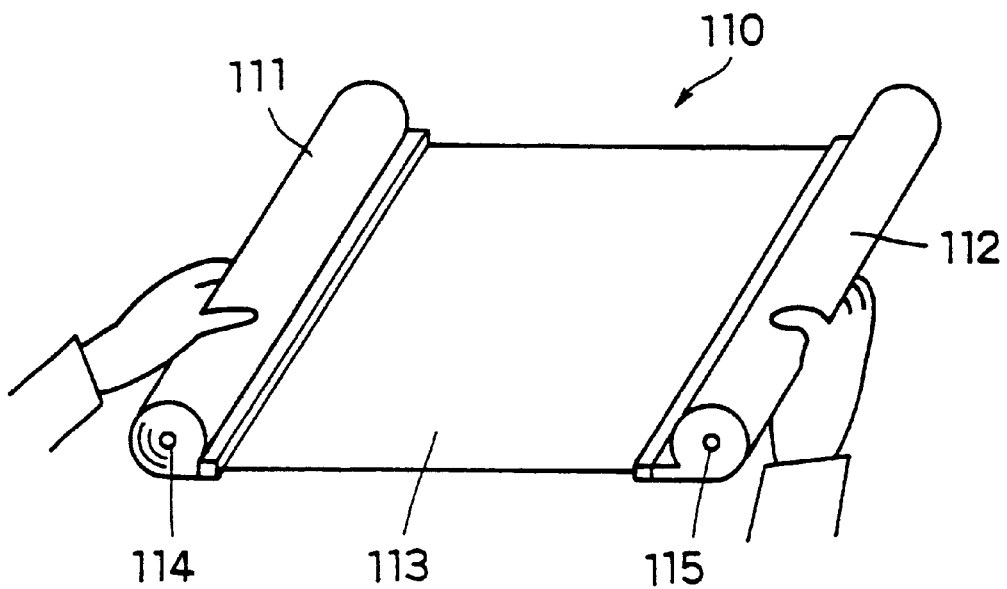

FIGS. 13A and 13B are diagrams schematically showing the mechanically scrollable display embodying the present invention; FIG. 13A illustrates the display when it is closed (rolled up), and FIG. 13B illustrates the display when it is open (unrolled).

In FIGS. 13A and 13B, reference numeral 110 represents the mechanically scrollable display, 111 represents a first winder, 112 represents a second winder, and 113 represents a display medium.

When the mechanically scrollable display 110 is in an rolled-up state, the display medium 113 is completely wound up around either the core shaft 114 of the first winder 111 or the core shaft 115 of the second winder 112.

Between the first and second winders, a write unit and an erase unit are disposed. The write unit and the erase unit may be formed and disposed together beside the first winder, or they may be formed and disposed separately, one beside the first winder and the other beside the second winder.

When the mechanically scrollable display 110 is carried around or not in use, or while information is being recorded onto its display medium 113, the display 110 is rolled up, as shown in FIG. 13A, so that the first and second winders 111 and 112 come close to each other. In this state, the display is compact enough to carry around.

To view the information displayed on the display medium 113, the display 110 is unrolled, as shown in FIG. 13B, so that the first and second winders 111 and 112 come apart from each other. In this state, with an appropriate area of the display medium 113 unrolled, it is possible to view the information recorded on that area.

Figure 14A:
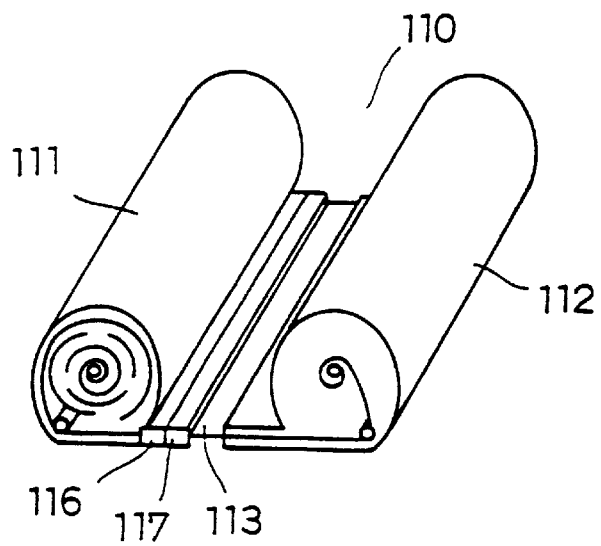
FIGS. 14A to 14C are diagrams, partly in cross section, showing various states of the mechanically scrollable display in use, FIG. 14A illustrating the state before information is recorded on the display medium, FIG. 14B illustrating the state after information has been recorded on the entire display medium, and FIG. 14C illustrating the state after the display medium has been rewound completely after the viewing of the information displayed on the display medium.
Figure 14B:
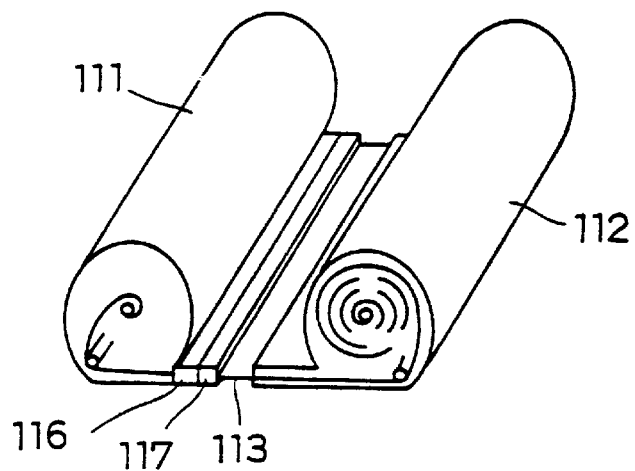
Figure 14C:
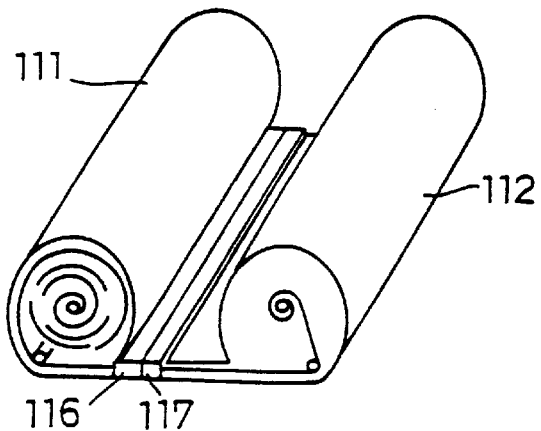

FIGS. 14A to 14C are diagrams, partly in cross section, showing various states of the mechanically scrollable display 110 in use; FIG. 14A illustrates the state before information is recorded on the display medium 113, FIG. 14B illustrates the state after information has been recorded on the entire display medium 113, and FIG. 14C illustrates the state after the display medium 113 has been rewound completely after the viewing of the information displayed on the display medium 113.

In the state shown in FIG. 14B, when a signal is fed to the write unit 116, a thermal head provided therein is driven to perform write operation on the display medium. Meanwhile, in synchronization with the write operation of the thermal head, the display medium is unwound from the first winder and is then wound around the second winder by a drive motor provided at the second winder. This motor is coupled to the core shaft of the winder, or to a platen feed roller (not shown) that is used to feed the display medium. In this embodiment, the write unit 116 and the erase unit 117 are disposed near the entrance/exit portion of the first winder 111.

Information is written to the display medium 113 in the following manner. When the drive motor coupled to the second winder 112 or to the platen feed roller is driven, the display medium 113 wound up around the first winder 111 is transported to the second winder 112. Meanwhile, the display medium 113 passes beside the write unit 116 and the erase unit 117 that are provided near the first winder 111 (see FIG. 14A).

While the display medium 113 passes beside the write unit 116, the write unit 116 is supplied with energy in the form of an electric signal that reflects the information to be recorded, so that the information is written sequentially to that portion of the recording medium 113 which is located beside the write unit 116 at each instant of time. This is continued until the entire information is written to a particular area of the display medium 113 (see FIG. 14B).

When the entire information recorded on the display medium 113 has been read through, and there is no need to view the information again, the display medium 113 is rewound from the second winder 112 to the first winder 111, and in the mean time the erase unit 117 is supplied with energy so that the information is erased sequentially from that portion of the recording medium 113 which is located beside the erase unit 117 at each instant of time. This is continued until the entire information is erased from a particular area of the display medium 113 (see FIG. 14C).

Figure 15:
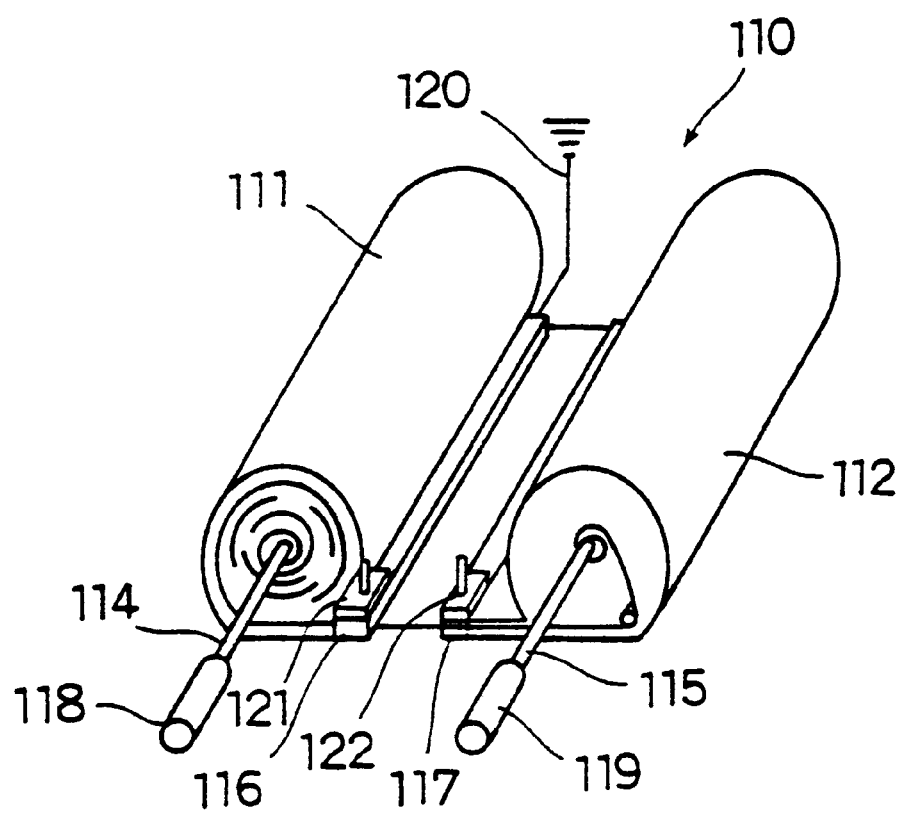
FIG. 15 is a diagram schematically showing the construction of the mechanically scrollable display.

FIG. 15 is a diagram schematically showing the construction of the mechanically scrollable display embodying the present invention.

As shown in FIG. 15, the mechanically scrollable display 110 is provided with motors 118 and 119 for driving the winders, a signal input portion 120, and switches 121 and 122 for activating and deactivating the write and erase units. A signal fed from outside is first stored in a memory, and is then converted into a signal suitable to drive a thermal head. The thus converted signal is fed via a drive circuit to the thermal head provided in the write unit, and the thermal head then writes the information carried by the signal to the display medium. When the information, after being displayed and read through by the user, becomes unnecessary, it is erased by the erase unit.

As the above-mentioned input signal that is fed from outside, any image signal such as a television, video, or facsimile signal can be used, provided that it is processed by a suitable signal processing circuit beforehand.

Moreover, it is also possible to use, as the input signal, data prepared on a personal computer or the like.

Furthermore, it is also possible to store image data of one or more screens in the above-mentioned memory so that such data is read out and written to the display medium screen.

In the embodiment under discussion, the erase unit 117 is provided beside the second winder. Moreover, the entire mechanically scrollable display may be fixed on a board-like base member having an appropriate area so as to be supported thereby. By so doing, the display can be used as a so-called whiteboard.

The display device (display medium) employed in the embodiment under discussion is of the same type as the reversible display device constituting the display portion of the videocassette described above.

Next, a description will be given as to the construction of the write unit and the erase unit used in the mechanically scrollable display embodying the present invention.

Figure 16:
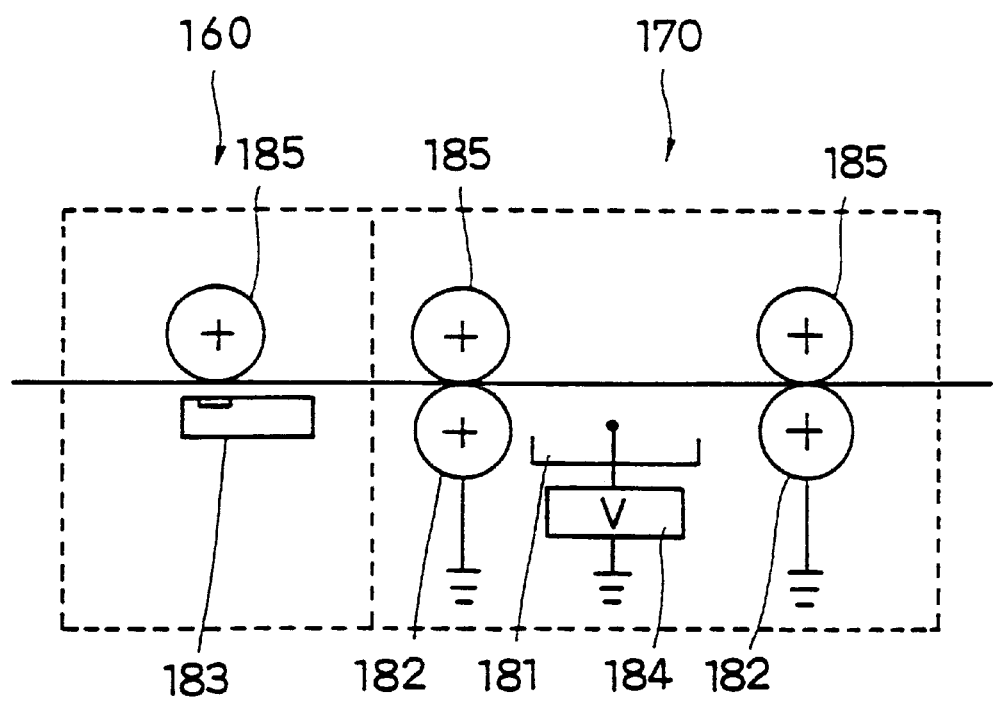
FIG. 16 is a diagram showing the outline of the construction of the write and erase units for use with a display medium formed with a polymer-dispersed liquid crystal film.

FIG. 16 is a diagram showing the outline of the construction of the write and erase units for use with a display medium formed with a polymer-dispersed liquid crystal film as described above.

Note that, although the write unit 160 and the erase unit 170 are illustrated next to each other as one unit in FIG. 16, they may be divided into two separate units, as indicated by the broken lines.

The write unit 160 has a platen roller 185, and a thermal head 183 disposed opposite the platen roller 185. The thermal head 183 performs write operation in response to a predetermined signal.

The erase unit 170 has a charger 181, a power supply unit 184 for supplying a predetermined voltage to the charger 181, grounding rollers 182, and platen rollers 185 that are disposed opposite the grounding rollers 182 and serve to bring the surface to be processed of the display medium 136 into close contact with the grounding rollers 182. Information is recorded on the display medium 136 by application of heat thereto, and the information recorded on the display medium 136 is erased by application of a voltage thereto. The charger 181, which typically is a corona charger, has in its interior a tungsten wire connected to the power supply unit 184. On the other hand, the grounding rollers 182 and the chassis of the power supply unit 184 are grounded. As a result, a potential difference occurs between that portion of the display medium 136 which is charged by the charger 181 and those portions of the display medium 136 which are in contact with the grounding rollers 182, and thus an electric field is applied to the reversible display device in a direction perpendicular thereto.

As the charger 181, it is possible to use the well-known corotron or scorotron charger, or the like. The grounding rollers 182 are rollers made of plastic, rubber, or other containing conducting material such as metal or carbon black; in particular, an elastic material such as rubber is suitable for this purpose, because, with such a material, it is easy to secure close contact. Instead of the thermal head 183, a heater utilizing the heat of a laser beam may be used.

As described above, in this embodiment, the write unit 160 for writing information to the display medium 136 has at least an electric-field application means 181 and a thermal head 183, both used to change the display states of the display medium 136. Theoretically, the electric-field application means 181 and the thermal head 183 are each capable of both recording and erasing information. However, it is preferable to use the electric-field application means 181 for erasing, because there is then no possibility that the displayed information will be erased by heat under normal ambient conditions, and thus it is possible to enhance the display reliability of the display medium 136.

Moreover, the electric-field application means 181 of the erase unit 170 can be realized by various methods other than the one used in the above described embodiment. For example, it is possible to use one of the methods which the inventor of the present invention has proposed, as methods for applying an electric field to a PDLC film 141, in Japanese Patent Applications Nos. 6-103249 and 6-302701, "Method of Non-contact Liquid Crystal Molecule Orientation for Liquid Crystal Display Media and Device for Liquid Crystal Molecule Orientation" (using a charger), and in Japanese Patent Application No. H6-302702, "Method of Liquid Crystal Molecule Orientation for Liquid Crystal Display Media and Device for Liquid Crystal Molecule Orientation" (using electrodes). These methods can be classified differently in terms of different aspects, for example, between non-contact methods and contact methods, between methods using a charger and methods using an electrode, between single-surface methods in which an electric field is applied within one surface only and surface-to-surface methods in which an electric field is applied between the top and bottom surfaces, and so forth. Of course, these methods can be used independently or in combination in accordance with the physical properties of the display medium to be used. For example, the erase unit 170 shown in FIG. 16 employs a surface-to-surface method in which a charger (non-contact method) and electrodes (contact method) are used in combination. Moreover, many variations are possible with respect to the number of chargers and electrodes provided.

For example, in the arrangement, shown in FIG. 16, of three electric-field application means, that is, the electrode 182, charger 181, and electrode 182, if the charger 181 at the center is replaced with an electrode (which is, in this case, not grounded but supplied with a voltage), the arrangement is then said to be employing a singe-surface contact method using electrodes; alternatively, if the electrodes 182 at both sides are replaced with chargers, the arrangement is then said to be employing a single-surface non-contact method using chargers. Moreover, the number of electric-field application means may be reduced to two by using a combination of an electrode 182 and a charger 181, or an electrode 182 and another electrode 182, or a charger 181 and another charger 181. In any of these cases, two adjacent electrodes or chargers need to be supplied with different voltages (for example, a ground voltage to one and a positive or negative voltage to the other, or a positive voltage to one and a negative voltage to the other). Furthermore, it is also possible to constitute each electrode 182 or charger 181 of two members such that they pinch the display medium 136 from both surfaces. In this way, various methods and arrangements can be used in this embodiment.

To erase all the information recorded on the display medium 136, an electric field is applied over the entire display area. To erase part of the information recorded on the display medium 136, for example, in a case where the rewritable display area is divided into more than one area separated by lines perpendicular to the direction of transport of the display medium 136 so that each area can be used individually, an electric field is applied only while the area where the information to be erased is recorded is passing beside the electrode 182 or charger 181.

The write unit 160 employs the thermal head 183 (having a resolution of 6 dots per mm and a heating capacity of 0.4 to 0.8 mJ per dot) of the type that is used in a thermal printer in order to write text, images, and other to the display medium 136.

The erase unit 170 employs the electric-field application means 181 and 182 in order to erase text, images, and other from the display medium 136 by applying an electric field thereto.

The mechanically scrollable display embodying the present invention may also be used as a write-only display if it is constructed without the erase unit. In this case, when the information recorded on the display medium 113 needs to be erased, the display medium 113 is taken out of the display and is processed on a separately provided erasing device that is equipped solely with the erase unit.

Moreover, the mechanically scrollable display embodying the present invention may be constructed without the write unit so that it can be used as a viewer of pre-recorded display media 113 on which information is pre-recorded on a separately provided writing device. In this case, for example, the writing device is installed at a newspaper distributor's shop, and there the subscribers buy pre-recorded display media on which news articles are pre-recorded.

Since the mechanically scrollable display embodying the present invention is portable and is capable of displaying information in a wide screen, it is suitable, to take a few examples, for (1) browsing news articles in a way as if browsing them in a newspaper;

(2) displaying maps; and (3) presenting product information to customers.

In these situations, information can be, as required, transferred from an information storage device or entered newly from an input device to the mechanically scrollable display. As a result, it is possible to eliminate the inconvenience of carrying around the whole amount of information contained in a newspaper, in an atlas, or in a set of presentation materials.

In the second embodiment described above, a rewritable display medium can be wound up into a roll. Accordingly, the display medium can be carried around in a compact form.

Moreover, the display medium wound up around the winder can be unwound into a screen having an appropriate area to display the information recorded thereon. Accordingly, a large amount of information can be displayed at a time, that is, in a large screen.

What is claimed is:

1. A method of using a recording medium having a display portion for displaying recorded contents, said recording medium permitting an image signal to be recorded thereon, said display portion being rewritable by being formed with a display device, wherein visible information can be repeatedly recorded and erased on the display device, said visible information including images, text, numbers and symbols, comprising:

a step of processing the image signal recorded on the recording medium so as to obtain image data to be written to the display portion; and a step of writing the image data to the display portion so as to display an image.

2. A method of using a recording medium as claimed in claim 1, wherein said display device changes its state between a recorded state and an erased state through action of an electric field in one direction and through action of heat in the other direction.

3. A method of using a recording medium as claimed in claim 2, wherein said display device is formed with a polymer-dispersed liquid crystal film that can change orientation of liquid crystal molecules dispersed in and held by high-polymer material through action of heat and an electric field.

4. A method of displaying a signal stored in a recording medium comprising:

providing a display portion on an outer casing of a recording medium, said display portion being rewritable by being formed with a display device, wherein visible information can be repeatedly recorded and erased on the display device;

recording an image signal on said recording medium;

processing said image signal to obtain image data; and writing said image data in said display portion so as to display an image of said recorded image signal.

* * * * *